US011871185B1

(12) United States Patent
Wessler

(10) Patent No.: US 11,871,185 B1
(45) Date of Patent: Jan. 9, 2024

(54) HEARING AID RETENTION TETHER

(71) Applicant: Sheenah Sling LLC, Naples, FL (US)

(72) Inventor: Sheenah Hankin Wessler, Naples, FL (US)

(73) Assignee: Sheenah Sling LLC, Naples, FL (US)

(*) Notice: Subject to any disclaimer, the term of this patent is extended or adjusted under 35 U.S.C. 154(b) by 0 days.

(21) Appl. No.: 17/671,751

(22) Filed: Feb. 15, 2022

(51) Int. Cl.
*H04R 25/00* (2006.01)
*H04R 1/10* (2006.01)

(52) U.S. Cl.
CPC ............. *H04R 25/60* (2013.01); *H04R 1/105* (2013.01); *H04R 2225/0213* (2019.05)

(58) Field of Classification Search
CPC ...... H04R 1/105; H04R 5/033; H04R 1/1066; H04R 1/1016; H04R 1/1033
See application file for complete search history.

(56) References Cited

U.S. PATENT DOCUMENTS 2,020,037 A * 11/1935 McMurray ........... A43B 23/082 12/146 D
3,879,804 A * 4/1975 Lawrence .............. G02C 3/003 24/3.3
4,471,509 A 9/1984 Marks
5,414,907 A 5/1995 Kiapos
5,465,466 A 11/1995 Napier
7,845,795 B2 * 12/2010 Williams ............... G02C 3/003 2/452
D759,149 S 6/2016 Brown
2003/0110798 A1 6/2003 Ignatowski
2005/0108855 A1 5/2005 Wolf
2010/0165286 A1 7/2010 Martin et al.
2013/0036766 A1 2/2013 Zimmerman
2013/0256345 A1 10/2013 Larkin
2020/0374614 A1 * 11/2020 Kim ...................... H04R 1/1033

OTHER PUBLICATIONS

European Patent Office; International Search Report and Written Opinion issued in app. No. PCT/US2023/062577 dated May 30, 2023.

* cited by examiner

*Primary Examiner* — Amir H Etesam
(74) *Attorney, Agent, or Firm* — Dinsmore & Shohl LLP

(57) ABSTRACT

A retention tether for a pair of in-ear devices includes a flexible tether having at least one central fixed weight secured thereto and a plurality of slidable weights thereon. The tether includes fixed or adjustable end loops for securing in-ear devices.

11 Claims, 9 Drawing Sheets

HEARING AID RETENTION TETHER

BACKGROUND OF THE INVENTION

Field of the Invention

The present invention relates generally to an apparatus for retaining and securing a pair of ear devices such as hearing aids or similar ear audio devices, such as "ear buds", to a user. The various embodiments described herein are directed to a weighted and balanced retention tether that engages and secures ear devices to a user in the event they inadvertently fall out or when a user removes them intentionally.

Description of the Related Art

Compact, lightweight audio devices for personal use have become ubiquitous as electronic technology has advanced. Excellent audio quality in-ear audio devices, commonly called "ear buds" as well as high quality hearing aids have become readily available to serve the listening requirements of a wide spectrum of users. These audio devices, particularly hearing aids and higher quality ear buds, can of course be quite expensive. Low-end hearing aids can cost as much as six hundred dollars while some high-end devices can cost ten times that amount.

The miniaturization of these ear devices is a terrific advantage, since they can easily be inserted in the ear, and in the case of hearing aids can be readily concealed if the user so desires. Unfortunately, this inherent advantage is also a disadvantage, since these tiny in-ear devices are quite easy to lose or misplace. In fact, it is quite common for a user to drop or lose an ear bud or hearing aid inadvertently, since they are so light and unobtrusive that the user is often unaware that one has fallen out. Furthermore, since these devices are so small it is quite easy to inadvertently misplace one or both of them.

Aside from the obvious economic difficulty of having to replace a lost hearing aid or ear bud, for hearing aid users the loss of a hearing aid can be quite traumatic due to the attendant difficulty of effectively communicating with hearing loss. It can take weeks or even months to procure suitable hearing aid replacements, thereby adding to a user's woes. Furthermore, once a hearing aid or ear bud has been lost and then found or replaced, users are likely to develop a constant need to check that they are in place, leading to a perpetual low level of anxiety when wearing the devices.

Additionally, where an ear bud or hearing aid is dropped in a public area, even when it is immediately retrieved, it should be thoroughly disinfected prior to being inserted back into the user's ear, since putting a dirty device in the ear can be a serious health risk due to the ear canal having a direct connection to the nasal passages and respiratory system.

Accordingly, there is a need in the art for an apparatus that secures and protects against the loss of ear devices, thereby alleviating the attendant financial loss, hygiene risks, inconvenience, and emotional distress of losing or misplacing these devices

SUMMARY OF THE INVENTION

The present disclosure is related to an apparatus for engaging a pair of in-ear devices and securing them to a user. The apparatus described herein provides a flexible tether having a predetermined sized loop at either end thereof. Each loop is sized to engage an ear device so that it is secured to the tether. The tether is lightly weighted at specified locations to provide tension on the ear devices as the user moves or changes orientation. Furthermore, the flexible tether can be provided in a plurality of overall lengths in order to accommodate users of varying sizes.

In various embodiments, the system disclosed herein provides a central weight that is affixed or secured proximate a midpoint of the flexible tether to lightly weight the tether and thus the ear devices around the user's neck. In some embodiments a slidable weight, or a plurality of slidable weights having apertures therein, are threaded along portions of the flexible tether to provide tension on selected portions thereof as a user moves and changes orientations.

In some embodiments both fixed and slidable weights are selected to provide a specific amount of weight to the flexible tether that is optimized to provide enough force to hold the ear devices in place as a user moves, but also be unobtrusive to the user.

In some embodiments the weights are comprised of natural materials such as stone, glass, or wood, and may be spherical in shape.

In some embodiments and aspects the flexible tether may be formed of an elastic, transparent material such as jewelry cord to make the device as unobtrusive as possible. Furthermore, the loops at either end of the tether may be adjustable to accommodate ear devices of different sizes and shapes, thereby providing for a customizable tether.

The term "ear devices" as used herein includes any type of apparatus that may be used on or in conjunction with an ear, whether inserted therein or secured in some way thereto. Furthermore, "ear devices" as used herein may encompass other articles capable of being secured by the apparatus described herein.

It should be appreciated that all combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other features, objects and advantages of the present invention will become apparent from the detailed description of the drawing Figures taken in conjunction with the appended drawing Figures.

BRIEF DESCRIPTION OF THE DRAWING FIGURES

In the drawings, like reference characters generally refer to the same parts throughout the different views. The drawings are not necessarily to scale. Emphasis is instead generally placed upon illustrating the principles of the disclosure, wherein.

DETAILED DESCRIPTION OF THE PREFERRED EMBODIMENT(S)

Figure 1:
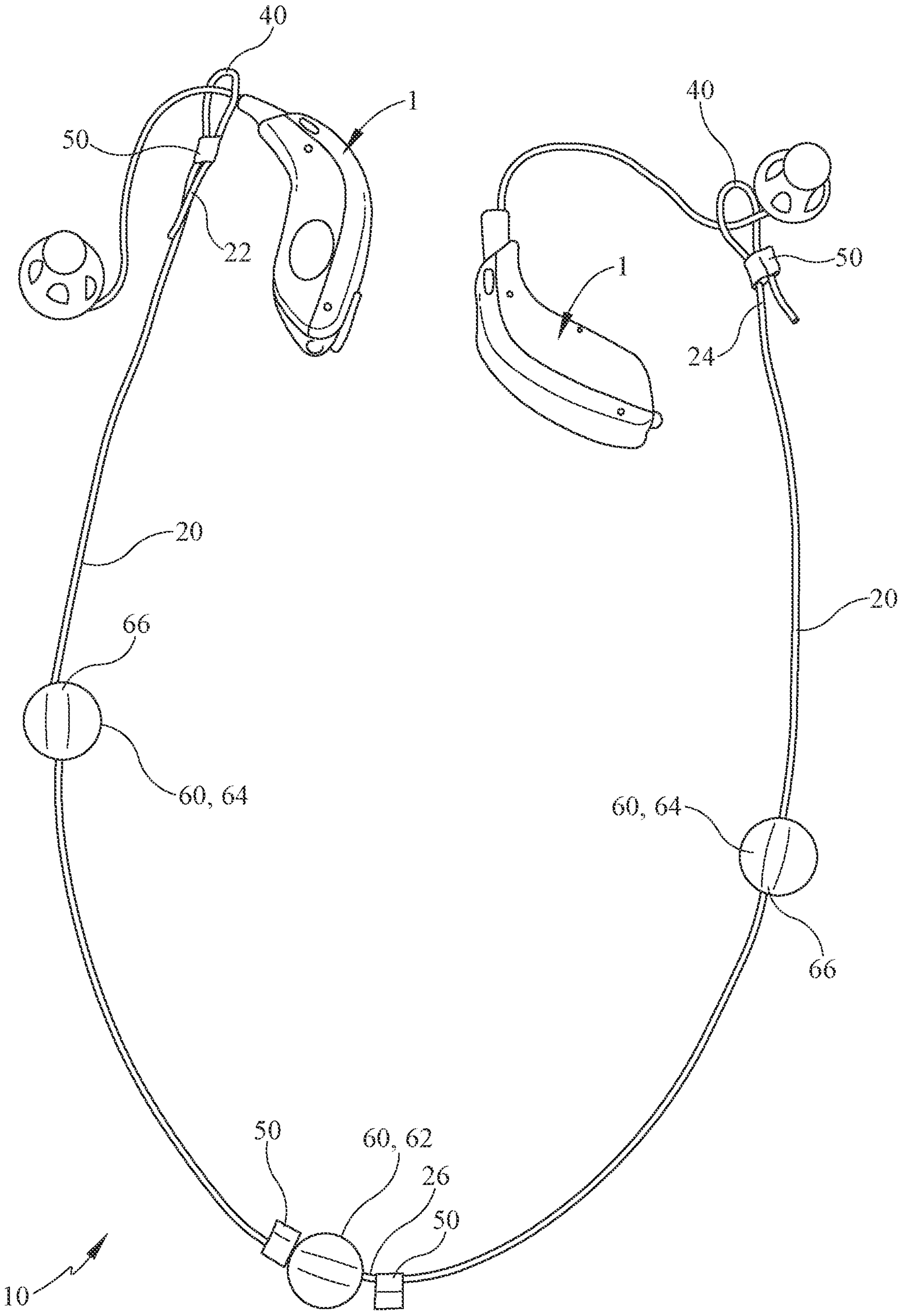
FIG. 1 is a perspective view of a retention tether in accordance with one embodiment.
Figure 2:
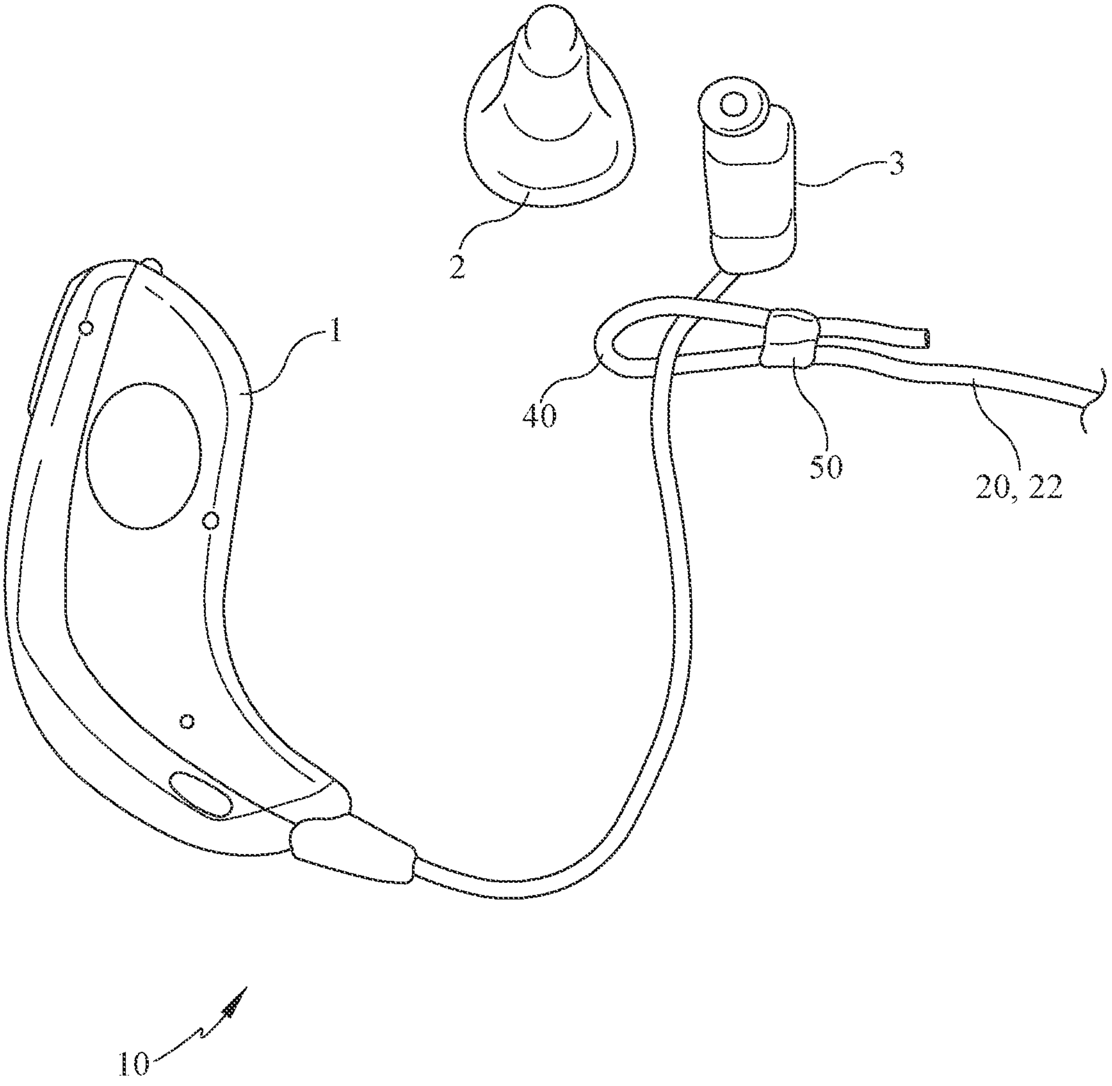
FIG. 2 is a partial perspective view of a retention tether in use with a hearing aid in accordance with one embodiment.

Referring now to drawing FIGS. 1 and 2, and in accordance with various embodiments and aspects, the system and apparatus described herein overcomes the aforementioned difficulties in the prior art by providing a retention tether 10 for a pair of ear devices 1 that, when properly used, prevents accidental loss or dropping of ear devices 1 while remaining unobtrusive to a user. It should be noted that throughout the instant specification that the term "ear devices" should be construed synonymously with "hearing aids", "ear buds", "audio devices", or any other relatively small object a user wishes to secure to their person without departing from the scope of the embodiments disclosed herein. As depicted in FIGS. 1 and 2 hearing aids 1 can include a battery compartment and amplifier for placement behind the ear, denoted generally by reference numeral 1, as well as a cone 2 that engages and covers the hearing aid speaker 3 prior to placement in the ear.

In some exemplary aspects and embodiments retention tether 10 comprises is a flexible, predetermined length tether 20 having a first end 22 and a second end 24. Each end 22, 24 terminates in a loop 40 that is sized to accommodate ear devices 1. As best seen in FIG. 2 loop 40 is sized to accept hearing aid 3 with cone 2 removed, whereupon cone 2 is then placed over hearing aid 3 to prevent it from slipping back through loop 40. Flexible tether 20 may in some embodiments be constructed of a stretchable, flexible material, for example jewelry cord. In further embodiments clear or transparent jewelry cord such as elastic stretch cord can be utilized as material for tether 20 although a wide variety of flexible cord materials may be used as flexible tether 20 material. In some aspects flexible tether 20 is comprised of 1 mm diameter transparent jewelry cord in a variety of lengths to accommodate users of various sizes. Flexible tether 20 may in some exemplary embodiments have an overall length between loop 40 crimps 50 of 11-13.5 inches, although smaller or larger sized flexible tethers 20 may be utilized.

In various embodiments loops 40 may be constructed by doubling first and second ends 22, 24 of flexible tether 20 and crimping them together utilizing a crimp 50, for example a jewelry crimp or similar plastic or metal crimp. Some embodiments may utilize silver jewelry crimps 50, for example silver crimps, having a weight of approximately 0.0635 grams each. Furthermore, loops 40 may be sized to accommodate various ear devices by moving the point at which ends 22, 24 are crimped. For example, loops 40 may comprise approximately 0.781 inches of flexible tether 20 material. However, a wide variety of loop 40 sizes may be employed in various embodiments without departing from the scope of the invention.

In some exemplary aspects and embodiments retention tether 10 further includes a plurality of weights 60 disposed in a plurality of locations along flexible tether 20. A central weight 62 is fixed or secured at a point proximate a midpoint 26 of flexible tether 20, for example by affixing a crimp on tether 20 on either side of central weight 62. Of course central weight 62 can be secured to flexible tether 20 using a wide variety of methods and fasteners without departing from the scope of the various embodiments. In some embodiments weights 60 may include a central aperture 66 therein, such that flexible tether 20 is routed through weights 60.

In accordance with other exemplary embodiments retention tether 10 includes a plurality of slidable weights 64 disposed along portions of flexible tether 20 by threading tether 20 through apertures 66. As depicted in FIGS. 1 and 3-8, at least one slidable weight 64 is positioned on either side of central weight 62. Slidable weights 64 a free to travel along flexible tether 20 from central weight 62 to loop 40 as the user moves, as will be discussed in detail below.

In some exemplary embodiments weights 60 are beads having apertures 66 therein. In some embodiments weights 60 are comprised of natural materials such as stone, glass, wood, or metal, and may be decorative in nature, or clear and unobtrusive. In some embodiments weights 60 are generally spherical while in some others they may be generally cylindrical in shape. Spherical weights 60 are more readily movable against a users' neck since a very small surface area of a spherical weight will be in contact with a user's skin at any given moment. Weights 60 can be comprised of a wide variety of materials without departing from the scope of the embodiments detailed herein. Weights 60, 62, 64 may also be specifically selected and sized to be approximately 0.84 grams each to add the slight but necessary weight to retention tether 20 and thereby effectively secure ear devices 1 in place as the user moves. By providing weights 60 and crimps 50 having relatively light weights, the embodiments detailed herein provide enough force to hold ear devices 1 in place while retention tether 10 is worn, but not so much weight as to make tether 10 obtrusive or irritating over the course of a day's use.

Figure 3:
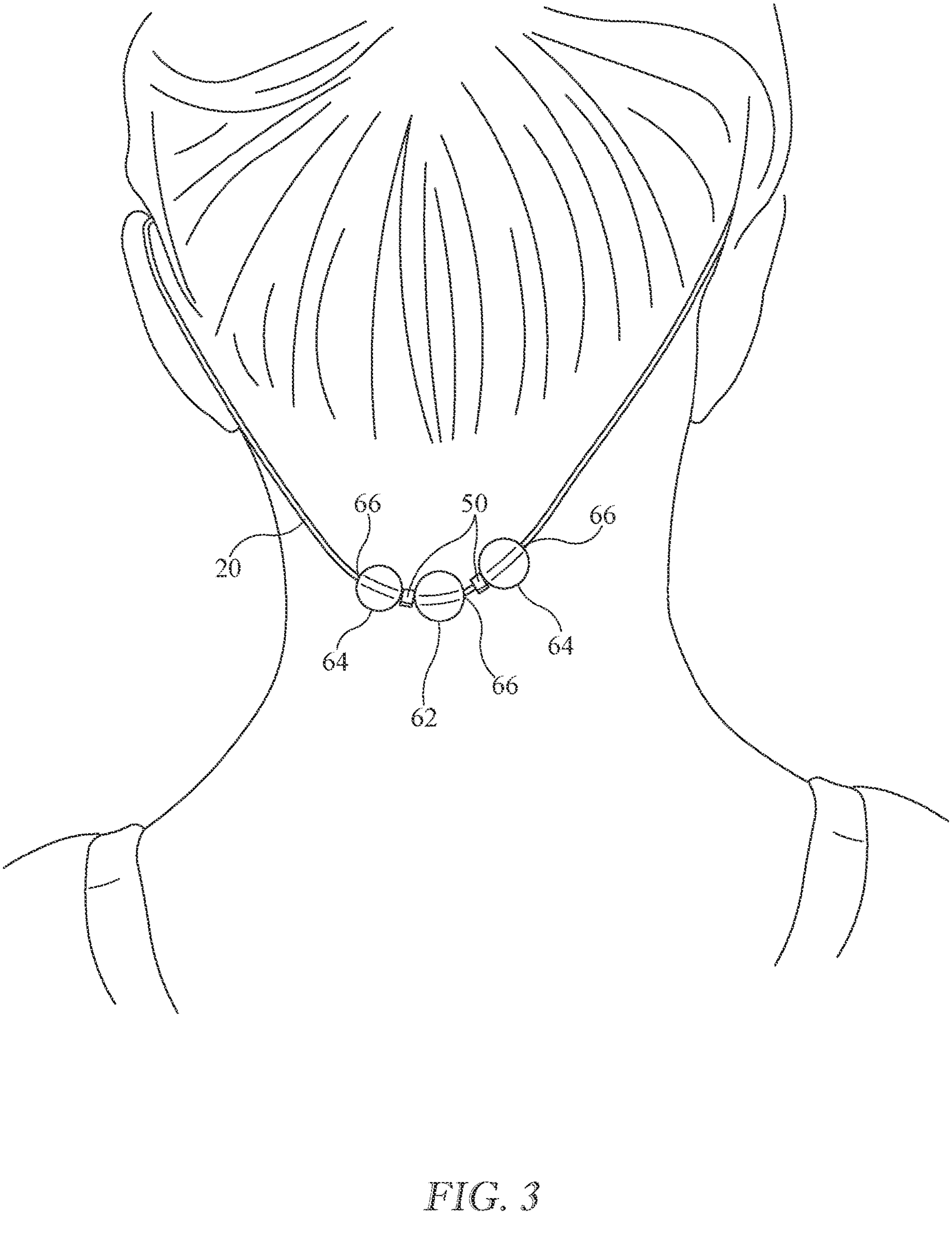
FIG. 3 is a rear perspective view of a retention tether around a user's neck in accordance with one embodiment.

FIGS. 3-6 and 8 depict the movement and operation of retention tether 10 as a user moves naturally during the course of a day. Referring to FIG. 3, the user's head is essentially upright such that slidable weights 64 have traveled along retention tether 20 until they abut central weight 62. Thus the three weights 62, 64 exert a slight force along retention tether 20, which is of course connected to loops 40 and thus audio devices 1 in the user's ears. This slight force acts to hold devices 1 in the ears.

Figure 4:
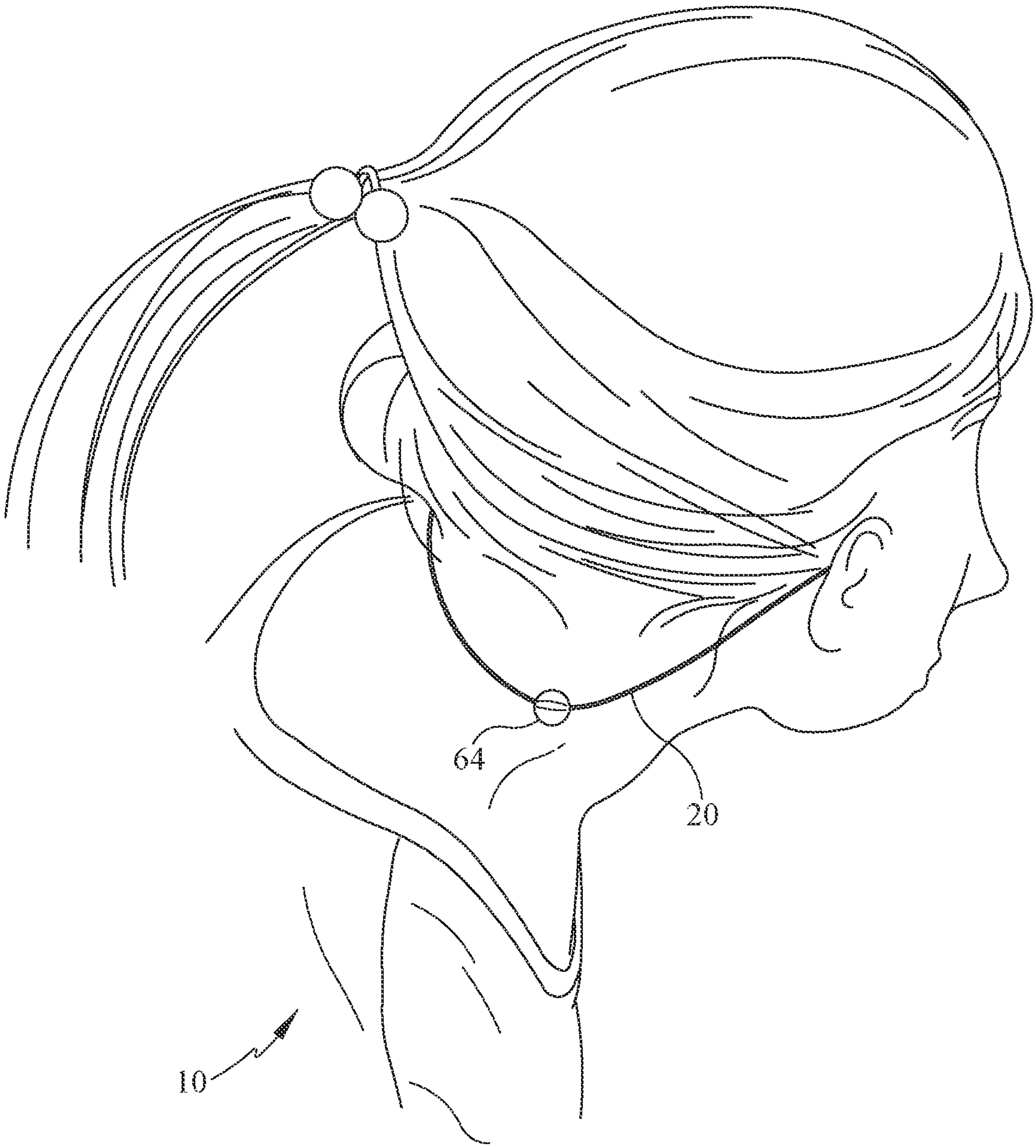
FIG. 4 is a side perspective view of a retention tether around a user's neck in accordance with one embodiment.
Figure 5:
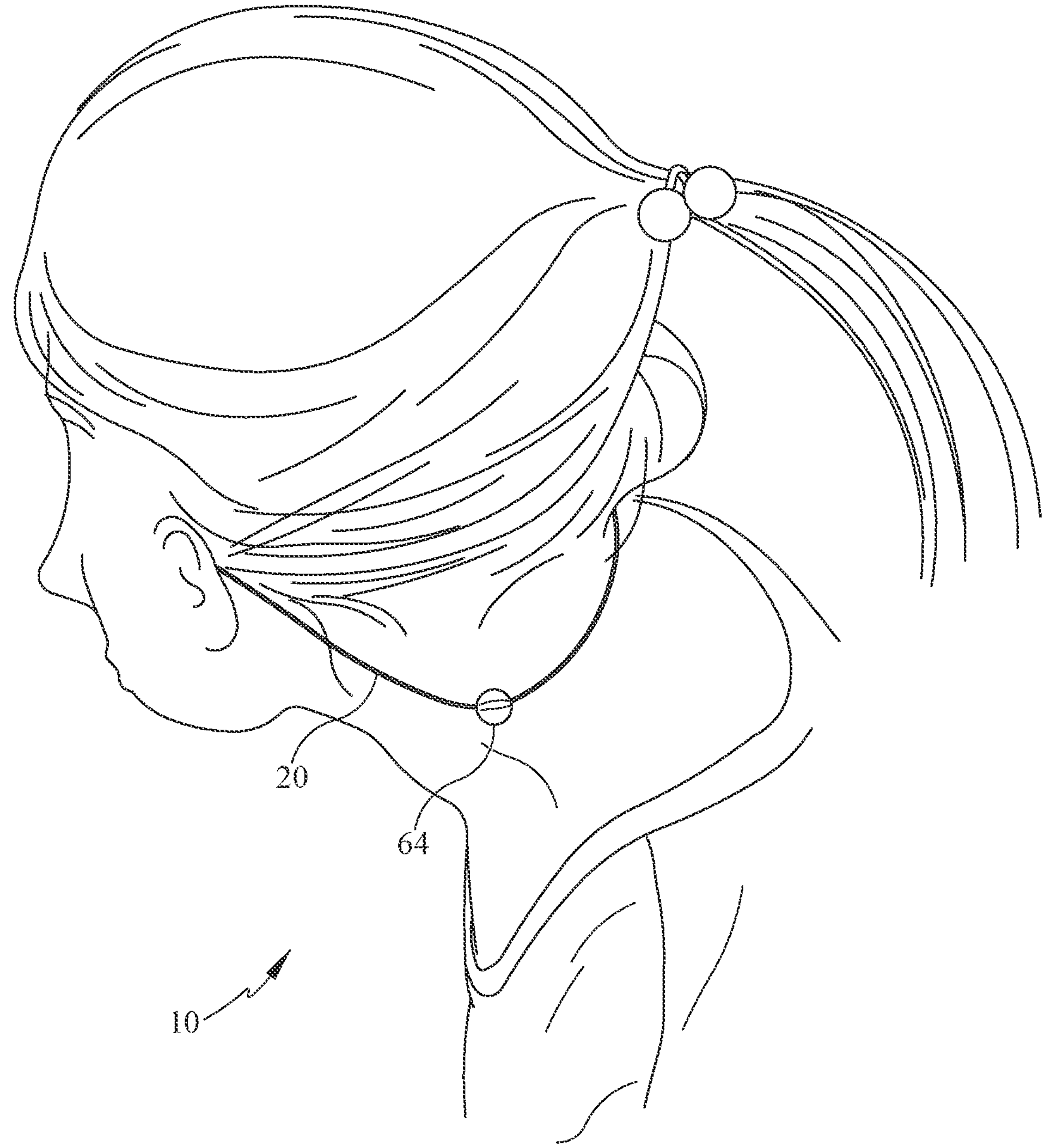
FIG. 5 is a side perspective view of a retention tether around a user's neck in accordance with one embodiment.
Figure 6:
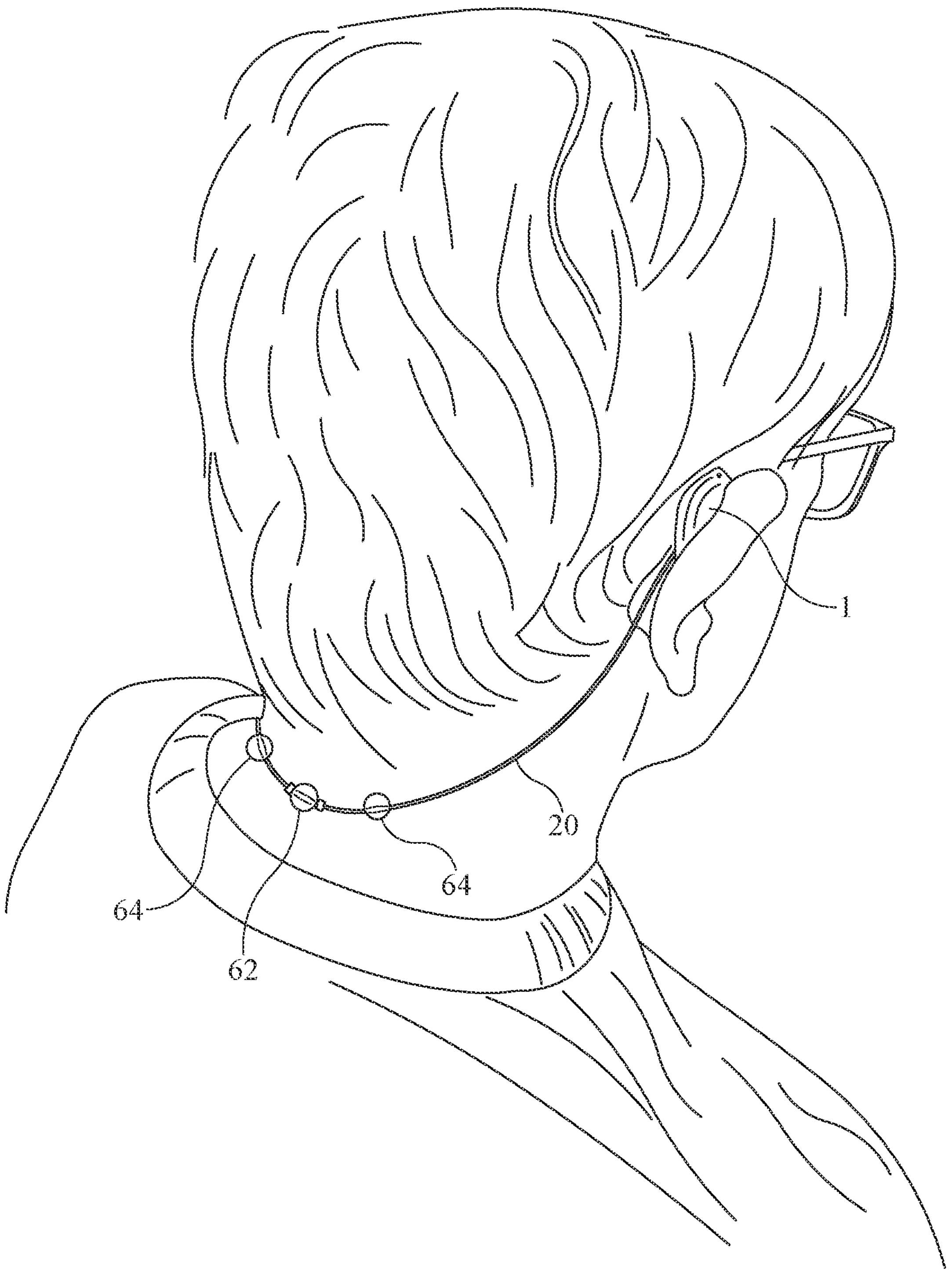
FIG. 6 is a side perspective view of a retention tether around a user's neck in accordance with one embodiment.

FIG. 4 depicts the user leaning slightly to her right, wherein the right side slidable weight 64 has traveled to the lowest point in elevation along flexible tether 20, away from central weight 62, thereby providing weight to the right ear device 1, thus inhibiting its movement out of the ear. FIG. 5 depicts the same operation of retention tether 10 as the user leans to the left, whereby slidable weight 64 has traveled to the lowest point in elevation along flexible tether 20, away from central weight 62, thereby providing weight to the left ear device 1, thus inhibiting its movement out of the left ear.

Figure 7:
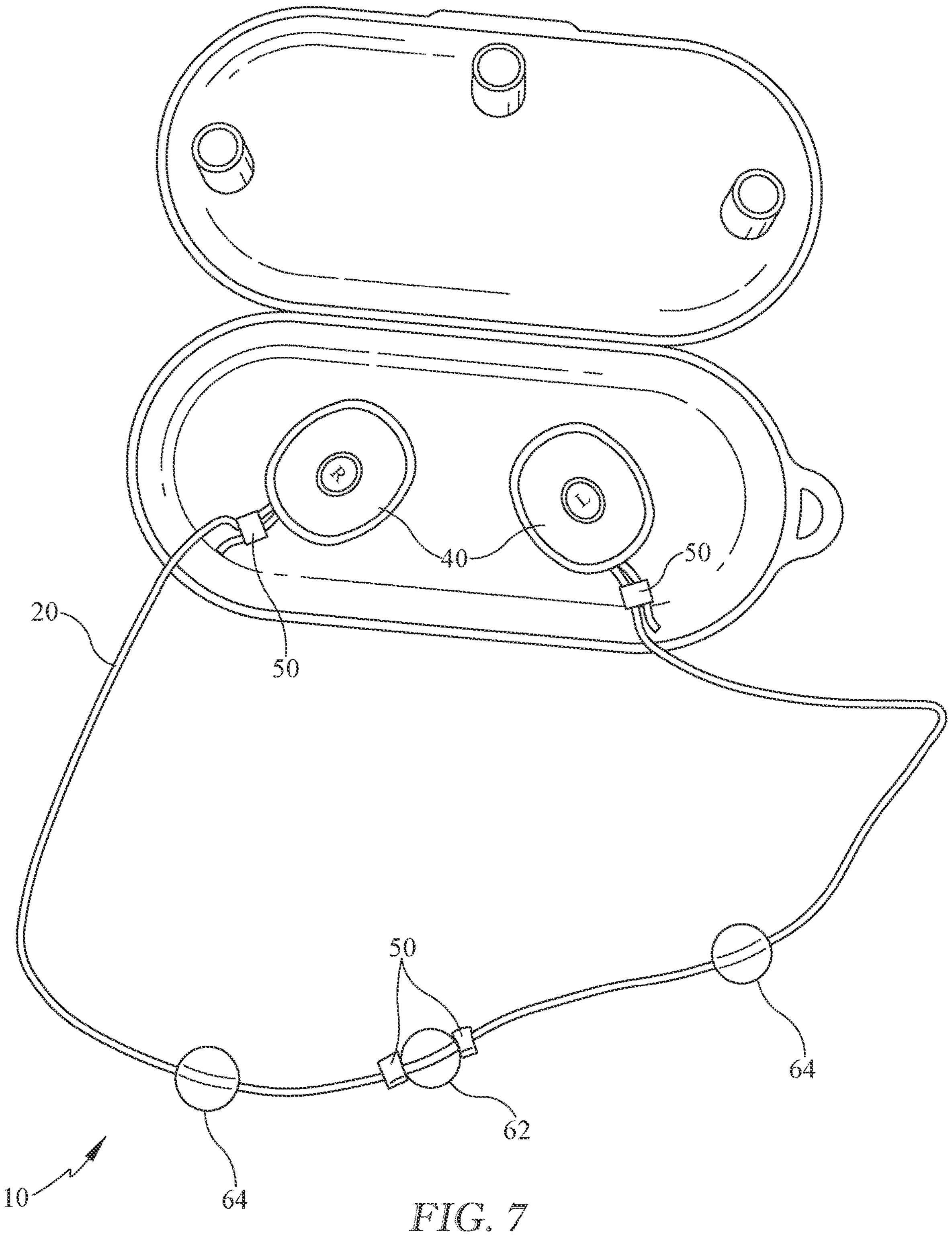
FIG. 7 is a perspective view of a retention tether in use with ear buds.

FIG. 7 depicts use of retention tether 10 with a pair of ear devices stored in a case or similar carrying apparatus. The small diameter of flexible tether 20 enables the user to store their ear devices in a carrying case without necessarily having to remove them from retention tether 10.

Figure 8:
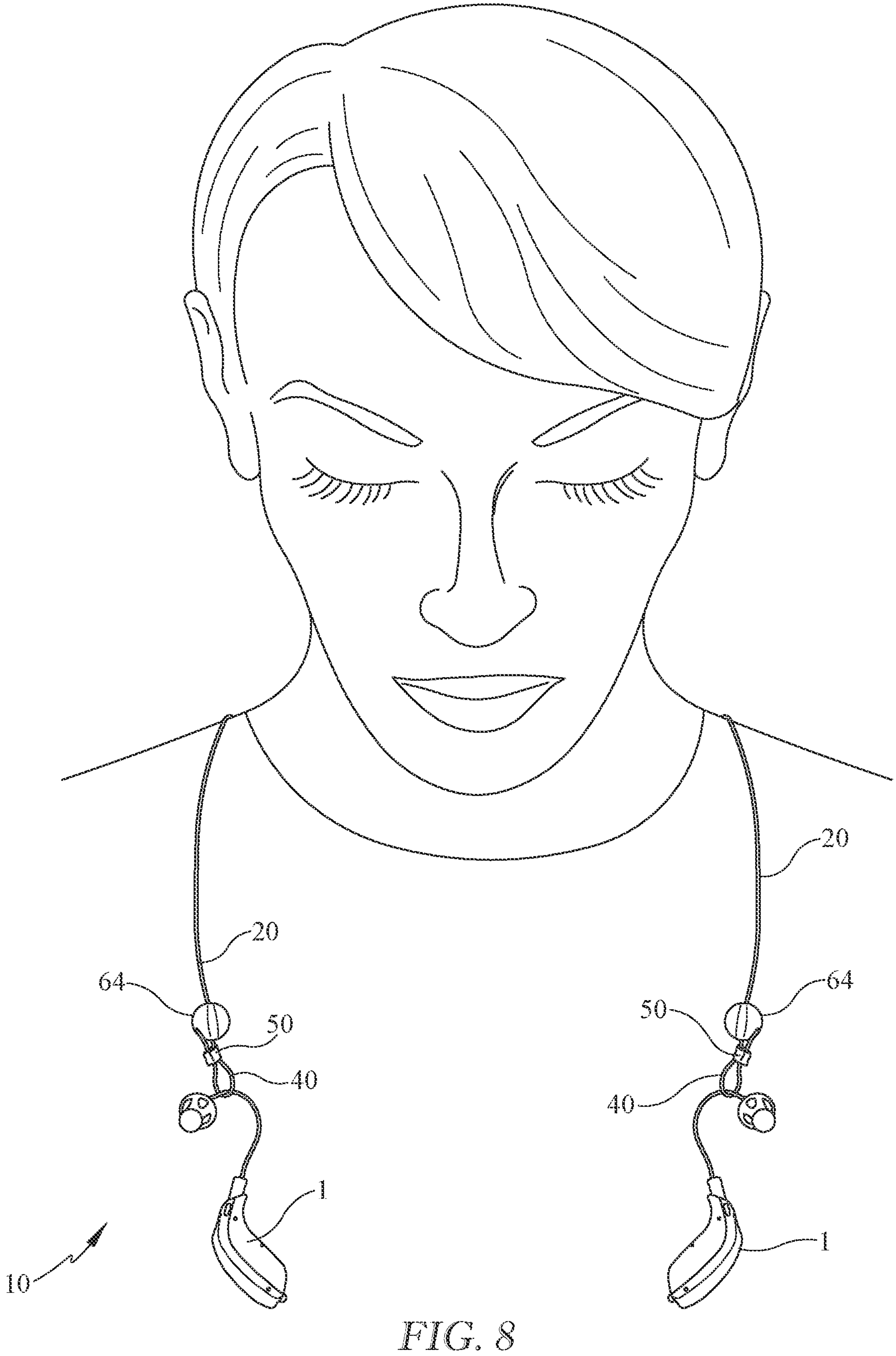
FIG. 8 is a perspective view of a retention tether in use with a hearing aid in accordance with one embodiment.

As best seen in FIG. 8, where a user wants to remove their ear devices 1, retention tether 10 hangs easily about the neck and shoulders since slidable weights 64 travel down flexible tether 20 until they contact loops 40, thus gently weighting ear devices 1 and preventing them from falling to the ground or otherwise away from the users' body. Furthermore, when ear devices 1 are removed from the user entirely, retention tether 10 provides a simple way to store or hold the devices, since it can be looped over a door knob, bed post, or lamp finial or the like.

Figure 9:
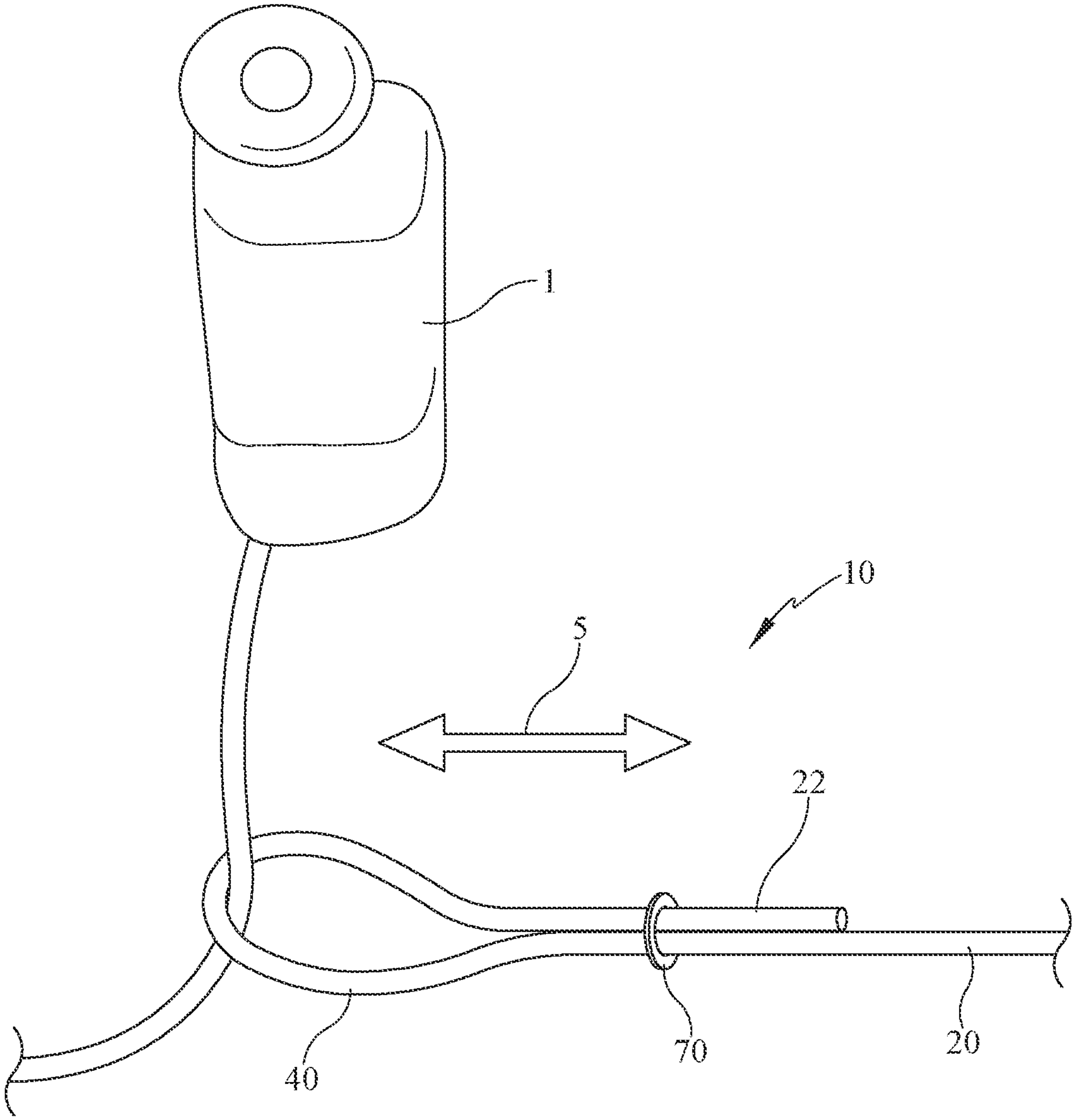
FIG. 9 is a partial perspective view of a retention tether in use with a hearing aid in accordance with one embodiment.

In some aspects and embodiments as best depicted in FIG. 9, retention tether 10 may comprise a slidable grommet 10 that is used to form loops 40 in place of crimps 50. Slidable grommet 70 may be small enough in diameter to cinch end 22 to flexible tether 20 to form loop 40. By providing the ability to slide grommet 70 along flexible tether 20 back and forth in the direction of the arrow 5 a user can size loop 40 to fit a wide variety of ear devices 1. This embodiment enables the use of retention tether 10 with many different ear devices 1 such as hearing aids, ear buds, or even other devices worn over the ear such as glasses.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. A retention tether for securing a pair of ear devices comprising:

a flexible tether having a predetermined length and first and second sides terminating in first and second ends, respectively, each of said first and second ends terminating in a loop for engaging a one of said ear devices;

a central weight having an aperture therein through which said tether is routed, and a pair of crimps secured to said tether on either side of said central weight to secure it at a point proximate the midpoint thereof;

a first slidable weight having an aperture therein, said aperture accepting the first side of said tether such that said first slidable weight is capable of movement between said tether first end and said central weight; and a second slidable weight having an aperture therein, said aperture accepting the second side of said tether such that said second slidable weight is capable of movement between said tether second end and said central weight.

2. The apparatus as claimed in claim 1 wherein said tether comprises a jewelry cord.

3. The apparatus as claimed in claim 2 wherein said tether is transparent.

4. The apparatus as claimed in claim 3 wherein said jewelry cord is one millimeter in diameter.

5. The apparatus as claimed in claim 1 wherein said central weight and said first and second slidable weights are substantially spherical.

6. The apparatus as claimed in claim 1 wherein said first and second loops are sized to accept a portion of said ear devices therethrough for securing said ear devices to said retention tether.

7. The apparatus as claimed in claim 1 wherein said central weight and said first and second slidable weights are each approximately 0.84 grams in weight.

8. The apparatus as claimed in claim 1 comprising:

a plurality of crimps whereby said loops are formed by crimping the first and second ends of flexible tether to themselves.

9. The apparatus as claimed in claim 1 comprising:

a plurality of slidable grommets positioned along the first and second ends of said flexible tether whereby said loops are formed by cinching said first and second ends of said tether to itself with said plurality of slidable grommets.

10. A retention tether for securing a pair of ear devices comprising:

a flexible tether having a predetermined length and first and second sides terminating in first and second ends, respectively, each of said first and second ends terminating in a loop for engaging a one of said ear devices;

a plurality of freely slidable weights disposed along said flexible tether, and a central weight disposed at a point proximate a midpoint of the length of said tether, said central weight being freely slidable between first and second fixed points proximate said tether midpoint.

11. The apparatus as claimed in claim 10 comprising:

a first slidable weight having an aperture therein, said aperture accepting said tether there through such that said first slidable weight is capable of movement between said tether first end and said central weight; and a second slidable weight having an aperture therein, said aperture accepting said tether there through such that said second slidable weight is capable of movement between said tether second end and said central weight.

* * * * *